| United States Patent [19] | [11] Patent Number: 4,795,549 |
| Coughlin et al. | [45] Date of Patent: Jan. 3, 1989 |

[54] UHP-Y-CONTAINING REFORMING CATALYSTS AND PROCESSES

[75] Inventors: Peter K. Coughlin, Yorktown; Jule A. Rabo, Armonk, both of N.Y.

[73] Assignee: Union Carbide Corporation, Danbury, Conn.

[21] Appl. No.: 874,488

[22] Filed: Jun. 16, 1986

[51] Int. Cl.$^4$ .............................................. C10G 35/06
[52] U.S. Cl. .................... 208/139; 208/138; 585/419
[58] Field of Search ................ 208/139, 138; 585/419

[56] References Cited

U.S. PATENT DOCUMENTS

| 3,293,192 | 12/1966 | Maher et al. | 423/328 C |
| 3,354,077 | 11/1967 | Hansford | 502/79 |
| 3,493,519 | 2/1970 | Kerr et al. | 502/79 |
| 3,513,108 | 5/1970 | Kerr | 502/79 |
| 4,417,083 | 11/1983 | Bernard et al. | 208/140 |
| 4,594,145 | 6/1986 | Roarty | 208/138 |

FOREIGN PATENT DOCUMENTS 895280  3/1972  Canada .

OTHER PUBLICATIONS

Breck, *Zeolite Molecular Sieves,* John Wiley & Sons, New York (1974) pp. 507–518.

*Primary Examiner*—Curtis R. Davis
*Attorney, Agent, or Firm*—Vincent J. Vasta, Jr.

[57] ABSTRACT

A catalyst for dehydrocyclization is disclosed comprising a Group VIII metal, the zeolite UHP-Y and, optionally, a halogen component. The instant invention provides reforming processes wherein more valuable products are formed that heretofore formed by use of other zeolite-containing catalysts.

29 Claims, 4 Drawing Sheets

UHP-Y-CONTAINING REFORMING CATALYSTS AND PROCESSES

BACKGROUND OF THE INVENTION

Reforming is generally known to the petroleum industry as a process for the treatment of naphtha fractions of petroleum distillates to improve their octane rating by producing aromatic components from components present in naphtha feedstocks. Reforming is a complex process and involves a number of competing processes or reaction sequences. These include dehydrogenation of cyclohexanes to aromatics, dehydroisomerization of alkylcyclopentanes to aromatics, dehydrocyclization of an acyclic hydrocarbon to aromatics, and hydrocracking of paraffins to lighter gases boiling outside the gasoline range. In addition, the dealkylation of alkylbenzenes and the isomerization of paraffins may occur in reforming processes. Many of the reactions occurring during reforming are not desirable owing to their deleterious effect on the yield of commercially valuable products or upon the octane of the products. For example, hydrocracking reactions produce light paraffin gases, e.g., $C_1$-$C_4$, and reduce the yield of products boiling in the gasoline range.

The interest in reforming catalysts and catalytic reforming processes is fueled by a desire to improve the production (yield) of the gasoline fraction while concurrently increasing its octane, while also having sufficient catalytic activity to minimize the use of excessive temperature conditions for the strongly endothermic dehydrocyclization process.

Several catalysts have been generally employed for catalytic reforming. Catalysts comprising platinum on chlorinated-alumina supports and Pt-X on alumina or chlorinated-alumina supports, where X is rhenium, iridium or tin, have been used for reforming naphthas. In addition, several disclosures have been made for processes employing alternative reforming catalysts. For example, several patents have disclosed the use of the zeolite mordenite in reforming catalysts, e.g., see U.S. Pat. Nos. 3,546,102; 3,679,575; 4,018,711 and 3,574,092. In addition, the use of ZSM-type zeolites in reforming catalysts and/or processes have been disclosed in U.S. Pat. Nos. 4,104,320; 4,417,083; 4,434,311 and 4,347,394. Further, the use of various forms of zeolite L is disclosed in U.S. Pat. Nos. 4,104,320, 4,447,316, 4,347,394 and 4,434,311. U.S. Pat. No. 4,417,083 discloses a process for the production of aromatic hydrocarbons in the presence of a two-bed process configuration employing a catalyst containing from 0.1 to 1.5% by weight of at least one metal selected from the group consisting of platinum, rhenium, iridium, tin and germanium, and containing sulfur in an atomic sulfur/metals ratio of from 0 to less than 1, supported on a crystalline, zeolitic aluminosilicate compensated by alkali metal cations, having a pore dimension larger than 6.5 Angstroms. The zeolite component is employed as a carrier. Among the zeolites that can be used are the Faujasites X and Y, the zeolite L, the zeolite omega and the zeolite ZSM-4.

Although several chemical reactions occur during reforming, principal desired reactions are the dehydrocyclization of paraffins and the dehydrogenation of naphthenes. The dehydrocyclization of a paraffin, containing six carbon atoms, is known to be relatively difficult, with the ease of paraffins dehydrocyclization generally increasing with the number of carbon atoms. Accordingly, an acidic reforming catalyst capable of forming aromatics from $C_6$ paraffins would also be considered as effective in the conversion of paraffins containing seven or more carbon atoms. This conversion of acyclic hydrocarbons to cyclized and dehydrogenated aromatic products produces valuable aromatic products. The octane of the gasoline fraction increases as a result of the decrease in paraffins and as a result of the increase in the higher octane value aromatic products.

Although the prior art catalysts for dehydrocyclization have included the use of Group VIII metals with chlorinated-alumina and selected zeolite supports, the prior art has generally not disclosed the use of molecular sieves as components with chlorinated-alumina based catalysts and has not disclosed the use of certain novel zeolitic molecular sieves as components of dehydrocyclization catalysts containing noble metals and chlorinated-alumina.

The instant invention relates to novel reforming catalysts and processes employing the molecular sieve UPH-Y (disclosed in Belgian Pat. No. 874,373, issued Feb. 22, 1979) as a component in reforming catalysts containing noble metals and alumina and/or chlorinated-alumina carriers.

DESCRIPTION OF THE INVENTION

The instant invention relates to reforming catalysts and reforming processes employing such catalysts. It has been discovered that the addition of UHP-Y to heretofore employed reforming catalysts provides catalysts characterized during use as having improved selectivity to iso-products and exhibiting improved activity in reforming/dehydrocyclization processes.

UHP-Y is disclosed in Belgian Pat. No. 874,373, issued Feb. 22, 1978 (incorporated herein by reference thereto) and is further described in U.S. Pat. No. 4,401,556 at column 2, lines 6 to column 4, line 9, said passage incorporated herein by reference thereto. Further, the preparation of UHP-Y is described in examples 1 and 4 of U.S. Pat. No. 4,401,556, said examples incorporated herein by reference.

"UHP-Y" is defined herein as a zeolite aluminosilicate having a $SiO_2/Al_2O_3$ molar ratio greater than 4.5 generally from 4.5 to 35, the essential x-ray powder diffraction pattern of zeolite Y, an ion exchange capacity of not greater than 0.070 relative to NaY, a unit cell dimension $a_o$ of less than 24.45 Angstroms, preferably from 24.20 to 24.35 Angstroms, a surface area of at least 300 m²/g (B-E-T), a sorptive capacity for water vapor at 25° C. and a P/Po value of 0.10 of less than 10.00 weight percent, preferably less 5.00 weight percent, and a Residual Butanol Test value of not more than 0.40 weight percent.

Example 1 of U.S. Pat. No. 4,410,556 discloses the preparation of a UHP-Y as follows:

A sample of air-dried ammonium exchanged type Y zeolite having a composition exclusive of water of hydration:

0.156Na$_2$O:0.849(NH$_4$)$_2$O:Al$_2$O$_3$:5.13SiO$_2$ was tableted into ⅛ inch diameter slugs and charged to a Vycor tube 24 inches in length and 2.5 inches in diameter and provided with an external heating means. Over a period of 0.25 hours, the temperature of the charge was raised to 600° C. and thereafter maintained at this temperature for one hour. During this 1.25 hour period, a pure steam atmosphere at 14.7 psia generated from demineralized water was passed upward through the charge in the tube at a rate of 0.1 to 0.5 pounds per hour. Ammonia gas generated during the heating period by deamination of the zeolite was passed from the system continually. At the termination of the heating period the steam flow through the tube was stopped and the temperature of the charge in the tube was lowered to ambient room temperature over a period of 5 minutes. Analysis of this steamed product indicated the characteristic X-ray powder diffraction pattern of zeolite Y, a surface area of 760 m$^2$/g and an a$_o$ value of 24.52 Angstroms. Thereafter the sodium cation content of the first steamed material was reduced to 2.0 equivalent percent (0.27) weight percent as Na$_2$O by ion exchange using an aqueous solution of NH$_4$Cl (30 wt.-%) at reflux. This product was thereafter converted to UHP-Y using the same apparatus and conditions except that the pure steam calcination atmosphere was passed over the sample in the reactor at 14.7 psia at a temperature of 800° C. for 4 hours. The product was then cooled to ambient room temperature in a desiccator and portions thereof analyzed for ion-exchange capacity, B-E-T nitrogen surface area, adsorption capacity for water, nitrogen and n-hexane and Residual Butanol Test value. The data from the analyses are set forth below:

| Adsorbate | Adsorptive Capacity: | | |
|---|---|---|---|
| | Pressure mm Hg. | Temp., °C. | Loading wt. - % |
| Nitrogen | 35 | −196 | 15.8 |
| Nitrogen | 66 | −196 | 16.5 |
| Nitrogen | 137 | −196 | 17.3 |
| Nitrogen | 528 | −196 | 19.2 |
| Water | 2.0 | 25 | 3.1 |
| Water | 4.6 | 25 | 4.6 |
| Water | 20.0 | 25 | 15.0 |
| n-Hexane | 5.0 | 25 | 10.8 |
| n-Hexane | 20.0 | 25 | 14.2 |
| n-Hexane | 50.0 | 25 | 16.0 |
| n-Hexane | 75.0 | 25 | 19.8 |

Ion-Exchange Capacity: = 0.04
Surface Area = 530 m$^2$/g
Residual Butanol Test Value = 0.23 weight percent As used herein in this specification and the appended claims, the following terms are intended to have the meanings set forth immediately below:

Surface areas are determined by the well-known Brunauer-Emmett-Teller method (B-E-T) (S. Brunauer, P. Emmett and E. Teller, J. Am. Chem. Soc. 60, 309 (1938)) using nitrogen as the adsorbate.

The essential X-ray powder diffraction pattern of zeolite Y is set forth in U.S. Pat. No. 3,130,007, issued Apr. 21, 1964 and is incorporated by reference herein in its entirety. It will be understood by those skilled in the art that the shrinkage of the unit cell in UHP-Y results from the stabilization process and causes some slight shift in the d-spacings. In all events, the X-ray diffraction pattern of the UHP-Y compositions will exhibit at least the d-spacings corresponding to the Miller Indices of Table A below, and can contain all the other d-spacings permissible to the face-centered cubic system with a unit cell edge of 24.20 to 24.45 Angstroms. The value of the d-spacings in Angstroms can be readily calculated by substitution in the formula:

$$d_{hkl} = \frac{a_o}{\sqrt{h^2 + k^2 + l^2}}$$

The X-ray pattern of the UHP-Y zeolites is obtained by standard X-ray powder techniques. The radiation source is a high intensity, copper target, X-ray tube operated at 50 Kv and 40 ma. The diffraction pattern from the copper K radiation and graphite monochromator is suitably recorded by an X-ray spectrometer scintillation counter, pulse height analyzer and strip chart recorder. Flat compressed powder samples are scanned at 1° per minute, using a 2 second time constant. Interplanar spacings (d) are obtained from Bragg Angle (2 theta) positions of peaks after subtracting background. The crystal symmetry is cubic.

TABLE A

| Miller Indices hkl | Intensity I/I$_o$ |
|---|---|
| 111 | very strong |
| 220 | medium |
| 311 | medium |
| 331 | strong |
| 333; 511 | medium |
| 440 | medium |
| 533 | strong |
| 642 | strong |
| 751; 555 | strong |

The anhydrous state of the zeolite composition for purposes of determining constituent proportions in terms of weight percent is the condition of the zeolite after being fired in air at 1000° C. for one hour.

The term ion exchange or "IEC" is intended to denote the number of active carbon sites in the zeolite which exhibit a strong affinity for water molecules and hence appreciably affect the overall capacity of the zeolite to adsorb water vapor. These include all sites which are either occupied by metal or non-metal cations, or which are not occupied by any cation, but in any event are capable of becoming associated with sodium cations when the zeolite is contacted at 25° C. three times for a period of one hour each with a fresh aqueous ion exchange solution containing as the solute 0.2 mole of NaCl per liter of solution, in proportions such that 100 ml. of solution is used for each gram of zeolite. After this contact of the zeolite with the ion-exchange solution, routine chemical gravimetric analysis is performed to determine the relative molar proportions of Al$_2$O$_3$, SiO$_2$, and Na$_2$O. The data are then substituted in the formula:

$$IEC = k[Na_2O/SiO_2]$$

wherein "k" is the $SiO_2/Al_2O_3$ molar ratio of the zeolite immediately prior to contact with the NaCl ion-exchange solution.

The Residual Butanol Test is a measure of the adsorptive selectivity of zeolite adsorbents for relatively non-polar organic molecules under conditions in which there is active competition between water and less polar molecules for adsorption on the zeolite. The test procedure consists in activating the zeolite sample by heating in air at a temperature of 300° C. for 16 hours. Thereafter, the activated zeolite crystals are slurried with a solution of 1-butanol in water in proportions such that the slurry consists of 1.0 part by weight 1-butanol, 100 parts by weight water and 10 parts by weight of the as-activated zeolite. The slurry is mildly agitated for 16 hours while the temperature is maintained at 25° C. The supernatant liquid is then analyzed for its residual 1-butanol content in terms of weight percent.

For the determination of the sorptive capacity of the UHP-Y compositions for any particular adsorbate, for example, water, the test zeolite sample is activated by preheating at 425° C. for 16 hours at a pressure of 1 micrometer of mercury in a conventional McBain apparatus. Thereafter, the temperature of the sample is adjusted to the desired value and contacted with the vapor of the test adsorbate at the desired pressure.

The UHP-Y may be subjected to additional surface treatments to modify the silica-to-alumina ratio and/or other surface properties. For example, treatment with mineral/organic acids, EDTA, acetylacetonate and the like may be employed. Such treatments may increase the $SiO_2/Al_2O_3$ ratio to greater than 35. Such treatments are well known in the art and may involve the extraction of aluminum or involve other surface modification of the zeolite.

UHP-Y may be employed in conjunction with the metal/chlorinated-alumina catalysts employed heretofore as dehydrocyclization catalysts. In one embodiment UHP-Y is employed with a dehydrocyclization catalyst comprising a Group VIII metal and, optionally, a chlorinated-alumina carrier. The term "carrier" is employed herein in its common meaning to demonstrate a support material for the metal component of the catalyst. The Group VIII metal is preferably platinum and is generally present in an amount from 0.2 to 0.8 percent by weight based on the weight of the carrier with from about 0.2–2% by weight chlorine on the weight of alumina. UHP-Y component is present in an amount between about 1 and about 99 and is preferably present in an amount between about 10 and about 80, based on the total weight of the catalyst. In another embodiment, UHP-Y is employed in a catalyst comprising one or more Group VIII metals and a non-Group VIII metal, including but not limited to rhenium, tin, and the like, as a bi-metallic catalyst and a chlorinated-alumina component.

UHP-Y-CONTAINING CATALYSTS

UHP-Y may be employed in conjunction with a Group VIII metal as a reforming/dehydrocyclization catalyst or may be employed in conjunction with a Group VIII metal/chlorinated-alumina catalyst(s) as generally employed heretofore as reforming/dehydrocyclization catalysts. In one embodiment a UHP-Y is employed with a traditional reforming catalyst comprising a Group VIII metal and a chlorinated carrier, e.g., an alumina. The term "carrier" is employed herein in its common meaning to denote a support material for the metal component of the reforming catalyst, when such a support material is employed. In one embodiment the metal component, e.g., Group VIII metal, is generally present in an effective amount from about 0.1 to about 2, preferably from about 0.2 and about 1.2 percent by weight (wt.%), more preferably between about 0.2 and 0.8 wt.%, based on the weight of the carrier, with from about 0.2–2% by weight halogen, preferably chlorine being present, based on the weight of the carrier, e.g., an alumina. (reference to "halogen" and/or to a specific halogen herein is intended to include one or more halogen.) In another embodiment, the UHP-Y may serve as the carrier and be halogenated, e.g., with chlorine or chlorine-containing compound. The UHP-Y component may be present in the catalyst in an amount between about 1 and about 99.9 percent by weight (wt. %), preferably present in an amount between about 5 and about 70 wt. % and more preferably between about 5 and 40 wt. %, based on the total weight of the catalyst. When a halogenated carrier component is present such as may be present in an effective amount between about 5 and about 95 percent by weight and is preferably present in an effective amount of at least 40 percent by weight, based on the total catalyst weight.

The UHP-Y-containing catalysts contain an effective amount of one or more Group VIII metals, e.g., nickel, ruthenium, rhodium, palladium, iridium or platinum. In one embodiment the UHP-Y is employed in a catalyst comprising one or more Group VIII metals in conjunction with one or more non-Group VIII metal components to form a bi-metallic catalyst and, optionally, may also be used with a halogenated-alumina component, as above described. The catalyst may contain a second metal component in conjunction with one or more Group VIII metal component and said second metal component may include a metal such as tin and/or transition metals such as rhenium and tungsten.

The preferred Group VIII metal for use herein is platinum. Platinum-containing catalysts generally exhibit high selectivity to high octane products. The percentage of platinum in the catalyst is generally between about 0.1 wt.% and about 2 wt.% and preferably between about 0.2 and about 1.2 wt.%, and most preferably between about 0.2 to 0.8, based on the total catalyst weight. In the prior art it has been observed that the lower limit corresponds to a lower catalyst activity and the upper limit to higher catalyst activity. When a second metal component is employed, the weight ratio of the Group VIII metal, e.g. platinum, to such second metal, e.g., rhenium or tin, is between about 1:5 and about 5:1 and is preferably between about 1:2 and about 2:1. The total amount of the metal components will be in the aforementioned ranges.

The metal component(s) of the UHP-Y-containing catalyst is generally introduced by means of impregnation using an aqueous solution of an appropriate salt of the desired metal(s). When it is desired to introduce two metal components, the operation may be carried out simultaneously or sequentially. The UHP-Y component may be employed as a carrier for the metal component with the metal component being present as either a cationic and/or a anionic metal species of the metal component. In one embodiment both UHP-Y and an alumina may be employed as a carrier for the metal component. When the metal component of the catalyst is added by addition to a separate carrier component, such as an alumina (including transition aluminas and gamma aluminas), to form a discrete component, the metal/carrier component is then physically admixed with UHP-Y. The mixture may then be mixed with a binder, e.g., a silica, if any, and formed, e.g., by coextrusion, into the final catalyst. In another embodiment; the UHP-Y and a carrier may be mixed prior to the impregnation or other introduction of the metal component.

By way of example, platinum can be introduced to the catalyst by impregnating (or other suitable introduction process) a carrier, e.g., a gamma-alumina or UHP-Y, with an aqueous solution of tetramineplatinum (II) nitrate, chloroplatinic acid, chloroplatinuous acid, dinitrodiamino-platinum, tetramineplatinum (II) chloride, anionic platinum complexes or cationic platinum complexes (such as tetramineplatinum (II) nitrate). Similar compounds of the other metal components may be employed. The use of a halogen containing (e.g., chlorine) salt or complex of platinum is generally beneficial in providing halogen (e.g., chloride or chloro-species) component, if any is desired, in the final catalyst.

As above discussed, an inorganic oxide is generally employed as a carrier for the metal component and/or halogen component. In addition, an inorganic oxide may be employed, as an optional component, as a binder component in the final catalyst. The inorganic oxides employable as a carrier for the metal and/or halogen components, and/or as a matrix component and/or as a binder component can be a natural or synthetically produced inorganic oxide or combination of such inorganic oxides. Typical inorganic oxides which can be used include clays, aluminas (preferably transition- and gamma-alumina), silicas, silica-aluminas, titanias, magnesia, alumina-boria, alumina-titania, and mixtures thereof. The preferred inorganic oxide carrier for the metal component(s) is believed to be an alumina, and more preferably a transition-alumina or a gamma-alumina. The preferred inorganic oxide components are believed to be aluminas and silicas. The inorganic oxide component(s) present as a binder or matrix component may be present in an amount from zero (0) to about 25 weight percent, based on the total catalyst weight, said amount not including any inorganic oxide present as a carrier for the metal and/or component(s).

The UHP-Y-containing catalysts can be employed in any of the conventional catalyst forms known to the art for reforming and/or dehydrocyclization catalysts, including pills, pellets, granules, broken fragments, or various special shapes. The catalysts can be employed in heretofore employed bed configurations including a fixed bed within a reaction zone, and the charging stock may be passed therethrough in the liquid, vapor (preferably the vapor phase), or mixed phase in either upward or downward flow. Alternatively, the catalyst may be prepared in a suitable form for use in moving beds, or in fluidized-solid processes, in which the charging stock is passed upward through a turbulent bed of finely divided catalyst. The instant catalyst(s) may be used in semi-regenerative, cyclic, semicyclic, or continuous reforming processes. Such processes are well known. The reaction products from any of the foregoing processes are separated from the catalyst, vented to atmospheric pressure, and fractionated to recover the various components thereof.

In one embodiment the UHP-Y-containing catalyst(s) of the instant invention may be employed in a tail reactor as the last catalyst bed in a process employing multiple catalyst beds. The first catalyst in such an embodiment would comprise a traditional reforming and/or dehydrocyclization catalyst and would generally be the same catalyst as employed in the instant process, except such would not contain the UHP-Y component.

After the desired metal(s) has been introduced, the catalyst is typically treated in air at about 400° C. to 600° C., preferably about 500° C.±50° C., and then reduced in the presence of a hydrogen-containing gas at temperatures of between about 200° C. and about 700° C., preferably between about 350° C. and about 500° C.

In some instances the selectivity of a UHP-Y-containing catalyst may benefit from an initial deactivation by steaming, coking or by treatment with sulfur compounds. Such deactivation methods are well known in the art to provide improved selectivity by decreasing the initial activity of the catalyst towards unfavorable reactions, e.g., hydrocracking.

FEEDSTOCKS

The feedstock in reforming is typically a mixed hydrocarbon fraction containing significant quantities of paraffinic hydrocarbons, commonly available in a typical refinery. Suitable feedstocks include, naphthas (virgin, cracked or Fischer-Tropsch), paraffinic or naphthenic straight-run naphthas, paraffinic raffinates from aromatic extraction or adsorption, upstream reformate feedstocks, heavy hydrocracked gasoline fractions, $C_6$-$C_9$ paraffin-rich streams and the like refinery streams. In the case of cracked naphthas, the naphtha is generally hydrogenated prior to use to reduce the presence of olefinic compounds. In a typical reforming operation the feedstock is a naphtha or petroleum fraction boiling in the range of between about 120° F. and about 450° F., and preferably between about 180° F. and about 380° F. Such fractions usually contain from about 20 to about 80 volume % paraffins, both normal and branched, which fall in the range of about $C_6$ to $C_{12}$. In one embodiment, the feedstock contains paraffinic hydrocarbons having about 6 to 12 carbon atoms per molecule. It is to be understood that such acyclic hydrocarbons can be charged individually, in admixture with one or more of the other acyclic hydrocarbons, or in admixture or as components of other hydrocarbon mixtures such as naphthenes, aromatics and the like.

Feedstocks comprising essentially acyclic hydrocarbons may be employed herein if dehydrocyclization is the desired reaction and can in general be any acyclic hydrocarbon capable of undergoing ring-closure to produce an aromatic hydrocarbon. That is, it is intended to include within the scope of the present invention, the dehydrocyclization of any acyclic hydrocarbon capable of undergoing ring-closure or capable of undergoing isomerization to form an acyclic hydrocarbon capable of undergoing ring-closure to produce an aromatic hydrocarbon under effective process conditions for reforming and/or dehydrocyclization. More particularly, suitable acyclic hydrocarbons include acyclic hydrocarbons containing 6 or more carbon atoms per molecule such as $C_6$-$C_{12}$ paraffins. Specific examples of suitable acyclic hydrocarbons are paraffins such as n-hexane, 2-methylpentane, 3-methylpentane, n-heptane, 2-methylhexane, 3-methylhexane, 3-ethyl-pentane, 2,5-dimethylhexane, n-octane, 2-methylheptane, 3-methylheptane, 4-methylheptane, 3-ethylhexane, n-nonane, 2-methyloctane, 3-methyloctane, n-decane and the like compounds.

Preferably, the feedstocks employed in reforming are substantially free of sulfur, nitrogen, metals, and other known poisons for reforming catalysts. The feedstock can have sulfur, nitrogen, metals, and other known poisons removed by conventional hydrotreating techniques or sorbers that remove such compounds.

In the case of a feedstock which is not already low in sulfur, acceptable sulfur levels can be obtained by hydrofining the feedstock in a pretreatment zone where the naphtha is contacted with a hydrofining catalyst which is resistant to sulfur poisoning. A suitable catalyst for hydrodesulfurization is, for example, an alumina-containing support containing molybdenum oxide, cobalt oxide and/or nickel oxide. Hydrodesulfurization is ordinarily conducted at 315° C. to 455° C., at 200 to 2000 psig, and at a liquid hourly space velocity of 1 to 5. The sulfur and nitrogen contained in the naphtha are converted to hydrogen sulfide and ammonia, respectively, which can be removed prior to reforming by suitable conventional processes.

REFORMING PROCESSES

Reforming processes may be carried out over a wide range of effective reforming process conditions. The actual process conditions depend on the particular reforming catalyst, the feedstock, the desired products, the reforming process design and the like. Process conditions for Catalytic reforming, Magnaforming, Platforming, Powerforming, Rheniforming and Ultraforming are well know in the art (see: "Hydrocarbon Processing," September 1982, at pages 164, 165, 166, 167, 168 and 169, respectively; incorporated herein by reference). Magnaforming is described at pages 111 to 114 of "Hydrocarbon Processing," June 1974 (incorporated herein by reference). A description of a representative reforming process is disclosed in U.S. Pat. No. 4,018,771 at column 5, line 19 to column 6, line 50, said passage incorporated herein by reference.

Typical reforming conditions include an effectibe temperature greater than 350° C., preferably greater than 400° C., to about 550° C. at a pressure between about 0 psig (1atm) and 500 psig and a hydrogen to feed ratio between about 2000 SCFB and about 8000 SCFB. The WHSV employed for the catalyst is typically within the range of about 0.1 to about 100 weight units of feedstock per hour per weight of catalyst and is preferably between about 1 and about 5.

The feedstock is contacted with the catalyst under effective reforming conditions as heretofore employed in the prior art. This contacting may be accomplished by using the catalyst in a fixed bed system, a moving bed system, a fluidized system, or in a batch-type operation. In a fixed bed system, the feedstock is preheated by any suitable heating means to the effective reforming process temperature and pressure and then passed into a reforming zone containing a bed of the catalyst. It is, of course, understood that the reforming process may be one or more separate reactors with suitable means therebetween to ensure that the desired conversion temperature is maintained at the entrance to each reactor. It is also important to note that the reforming feedstock may be contacted with the catalyst bed in either upward, downward, or radial flow fashion. In addition, the reactants may be in a liquid phase, a mixed liquid-vapor phase, or a vapor phase when they contact the catalyst. A reforming process typically comprises two or more fixed beds or dense-phase moving beds of the catalyst. In a multiple bed system, it is, of course, within the scope of the present invention to use the present catalyst in less than all of the beds with a conventional reforming catalyst being used in one or more upstream beds of the multi-bed system. The reforming zone may be one or more separate reactors with suitable heating means therebetween to compensate for the endothermic nature of the reforming process that takes place in each catalyst bed.

Reforming generally results in the production of hydrogen. Thus, exogenous hydrogen need not necessarily be added to the reforming system except for pre-reduction of the catalyst and when the feed is first introduced. Generally, once reforming is underway, part of the hydrogen produced is recirculated over the catalyst. The presence of hydrogen is generally understood in the art to reduce the formation of coke which tends to deactivate the catalyst. Hydrogen is preferably introduced into the reforming reactor(s) at a rate varying from greater than zero to about 30 moles of hydrogen per mole of feedstock and preferably between about 1 and about 8. The hydrogen can be added in admixture with light gaseous hydrocarbons.

Although hydrogen may be used, in some cases other art-recognized diluents may be advantageously utilized, either individually or in admixture with hydrogen. Other diluents include $C_2$ to $C_5$ paraffins such as ethane, propane, butane and pentane and mixtures thereof. Although methane may be present, such is generally not added as a diluent owing to the difficulty of separating it from hydrogen. If, after a period of operation, the reforming catalyst has become deactivated by the presence of carbonaceous deposits, said deposits can be removed from the catalyst by passing an oxygen-containing gas, such as dilute air, over the catalyst. Chlorine and/or chloro-compounds (in the presence of an oxygen-containing gas) are generally brought into contact with the catalyst to aid in redistribution of metal components present in the catalyst, if necessary. Regeneration of the UHP-Y-containing catalyst may be performed in the semi-regenerative mode in which the reforming operation is interrupted after a period of time and catalyst regeneration is carried out, or in the on-stream regenerative mode, in which a portion of the catalyst is regenerated while the reforming operation is continued over the remainder of the catalyst. Two types of onstream regeneration are generally known in the prior art, cyclic and continuous (in situ regeneration). In cyclic reforming, the catalyst in one of a series of reactors is regenerated while reforming is continued in the remainder of the reactors. In continuous reforming, a portion of deactivated catalyst is removed from operation, regenerated in a separate regeneration system while reforming is continued, and the regenerated catalyst is then returned to the reforming operation. The method of regenerating the catalyst will depend on whether there is a fixed bed, moving bed, or fluidized bed operation and the particular process constraints of the refiner. Regeneration methods and conditions for reforming are well known in the art and such are generally employable with the instant UHP-Y-containing catalysts.

In the following examples the products were evaluated in several respects by determining:

Calculated Density of $C_5+$ Product =

-continued $$\text{Wt \% } C_5+$$
$$\sum_{i}^{n} (\text{Wt. \%}_i/\text{Density}_i)$$

where i a component and n is the number of components present in the $C_5+$ products.

$$\text{Calculated Volume \% } C_5+ \text{ Yield } =$$

$$\frac{(\text{Wt. } C_5 \text{ Product})/(\text{Calculated } C_5+)\text{Density}}{(\text{Wt. Feed})/(\text{Feed Density})} \times 100$$

The Research Octane Number (RON) of the $C_5+$ product (products containing five or more carbons) was calculated using the published blending research octane numbers for individual $C_5+$ components and from their volume percent in the $C_5+$ product. The volume % of individual $C_5+$ components was calculated as follows:

$$\text{Vol \% Component}_g =$$

$$\frac{(\text{Wt. \% Component}_g \text{ in } C_5+)/(\text{Density}_g) \times 100}{\sum_{i}^{n} (\text{Wt. \% Component}_i)/(\text{Density}_i)}$$

where "g" is a particular component in products and "i" represents all components summed over all "n" components in $C_5+$ products.

The calculated RON was determined for the $C_5+$ product according to:

$$\text{Calculated RON} = \sum_{i}^{n} \left( RON_i \times \frac{(\text{Volume \% Component})_i}{100} \right)$$

where $RON_i$ is the blending research octane numbers for component "i".

The following examples are provided to illustrate the invention and are not intended to be limiting thereof:

EXAMPLE 1

(a) A reference catalyst (denominated "Reference Catalyst A") was prepared with a CATAPAL (pseudobehomite) alumina (CATAPAL is the trademark of Condea Alumina SB), which was calcined in air at 200° C. for 4 hours and heated for 16 hours at 540° C. to form a gamma-alumina. A twenty four gram sample of the gamma-alumina was impregnated with a solution containing 0.48 grams of $H_2PtCl_2$ and 0.96 grams of $Al(NO_3)_3$ in 8.4 grams of water. The alumina and the $H_2PtCl_2$ solution were mulled, dried at room temperature for one hour, remulled and then dried at 121° C. for 16 hours. The dried product (Pt/Cl-alumina component) was then calcined in air at 260° C. for two hours. The calcined product was formed into 1/16" extrudates by mixture with $SiO_2$ and the final extrudates contained 20 wt.% $SiO_2$ (LUDOX AS 40) binder. The $SiO_2$ was gelled prior to use with ammonium acetate (1 ml. of 16.7 wt.% ammonium acetate per gram of $SiO_2$). The extrudates were dried in air at 110° C. overnight for 16 hours and calcined in air at 540° C. for 3 hours. The extrudates were ground to form a 40–60 mesh (U.S. Standard). Reference Catalyst A contained the following amounts of platinum and chloride:

|  | Wt. % |
|---|---|
| Pt | 0.63 |
| Cl | 0.25 |

(b) A second reference catalyst (denominated "Reference Catalyst B") was prepared using 17.6 grams of CATAPAL (pseudobehomite) alumina (CATAPAL is the trademark of Condea Alumina SB) which was peptized with 1.8 grams of concentrated nitric acid and 26.4 grams of distilled water. The peptized alumina was mixed with 75.8 grams of a CATAPAL ™ alumina (LOI=25.5 wt. %) which was calcined in air at 540° C. in air for 16 hours (LOI=1.4 wt. %) to form gamma-alumina. This mixture was formed into 1/16 inch extrudates, dried at 110° C. for 16 hours and then calcined in air at 540° C. for 3 hours. The calcined extrudates (pore volume of 67.5 ml. per gram) were pore filled with 0.560 grams of $H_2PtCl_6$ in 0.77 grams of concentrated HCl, dried in air at 110° C. for 16 hours and then calcined at 540° C. for 3 hours. Reference Catalyst B had the following chemical composition:

|  | Wt. % |
|---|---|
| Pt | 0.63 |
| Cl | 0.52 |

EXAMPLE 2

(a) A catalyst according to the instant invention was prepared by preparing a mixture containing 40 wt. % of the Pt/Cl-alumina component prepared in part (a of example 1), 40 wt. % UHP-Y as disclosed in U.S. Pat. No. 4,401,556 and 20 wt percent of an $SiO_2$ binder (prepared as in example 1 (a)). The UHP-Y-containing mixture was extruded (1/16 inch), then dried in air at 120° C. for 16 hours and then calcined in air at 540° C. for 2 hours. This catalyst was denominated "Catalyst C".

(b) A second catalyst was formed by mixing 40 wt. % of a gamma-alumina powder (as prepared in example 1 (a)), 40 wt.% UHP-Y and 20 wt.% $SiO_2$ binder (as prepared in example 1 (a)). The mixture was extruded (1/16 inch extrudates) and the extrudates dried in air at 100° C. for 16 hours. The dried extrudates were then calcined in air at 500° C. for 2 hours. The calcined extrudates (water pore volume of 61 ml/gram and an LOI of 6.1 wt.%) were pore filled with 0.0168 grams $H_2PtCl_6$, 0.0057 grams conc. HCl and 0.0336 grams $Al(NO_3)_3.9H_2O$ per anhydrous gram of extrudate. The pore filled extrudates were dried in air at 110° C. for 16 hours and then calcined in air at 540° C. for 2 hours. This catalyst was denominated "Catalyst D".

(c) A comparative catalyst was prepared according to the preparation for Catalyst C, except UHP-Y was replaced by a zeolite denominated "LZ-210" and having a $SiO_2/Al_2O_3$ ratio of 9.0. The preparation of LZ-210 is disclosed in U.S. Pat. No. 4,503,023, incorporated herein by reference. LZ-210 is prepared by treatment of a Y zeolite having a $SiO_2/Al_2O_3$ molar ratio of at least 3 with a fluorosilicate salt. LZ-210 and UHP-Y both have the essential framework morphology of Y zeolite. The catalyst containing LZ-210 was denominated "Comparative Catalyst E".

(d) A comparative catalyst was prepared as in part (a) for Catalyst C, except the Pt/alumina component was calcined at 260° C. and the UHP-Y was replaced with a zeolite denominated LZ-M-8. LZ-M-8 is a synthetic analogue of zeolite mordenite structure available from Union Carbide Corporation, Danbury, CT. The LZ-M-8 is a low sodium, partially dealuminated, ammonium ion exchanged mordenite which is acid leached to give a product with a $SiO_2/Al_2O_3$ ratio of about 18. This catalyst was denominated "Comparative Catalyst F".

EXAMPLE 3

The catalysts prepared in examples 1 and 2 were evaluated for reforming/dehydrocyclization using a technical grade n-hexane feed containing:

|  | Wt. % |
|---|---|
| n-hexane | 86.357 |
| methylcyclopentane | 9.694 |
| 3-methylpentane | 3.741 |
| 2-methylpentane | 0.207 |
| RON(Research Octane Number) | 29.27* |

*calculated RON

The catalysts were evaluated using a micro reactor comprising a stainless steel tube (¼ inch (ID)) and using about 0.35–0.36 grams of the selected catalyst (40×60 mesh, U.S. Standard). The selected catalyst was heated to 900° F. over 2½ to 3 hours under $H_2$ (120 ml/min. 100 psig) and held at 900° F. for 1 hour and then cooled to 860° F. The $H_2$ was lowered to 75 ml./min. and the feed was introduced into the micro reactor. The micro reactor was maintained at the process temperature by a fluidized sandbath.

Each catalyst was evaluated by preheating the micro reactor to 860° F. (or the selected reaction temperature) and introducing the n-hexane feed at a pressure of 100 psig, a Weight Hourly Space Velocity (WHSV) of 7.7 and a hydrogen/feed molar ratio of 5.4. Products were collected at selected run times and the products were analyzed by gas chromatography. The weight percent products and other reported values were computed on the basis of a 100% material balance. The volume percent was calculated using product densities and assuming no volume changes occurred upon mixing of product components. The RON of the feedstock and products was calculated using the calculated volume percents and the blending research octane numbers of the individual components.

Figure 1:
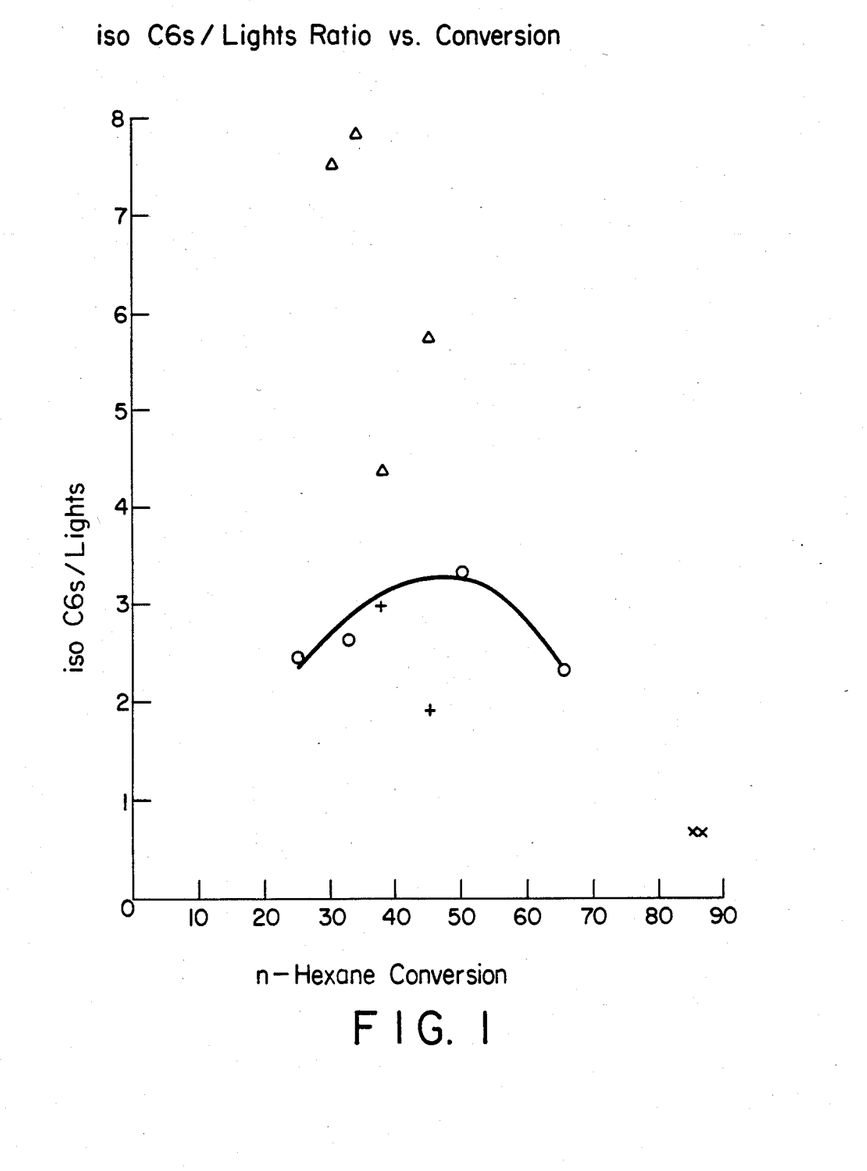
FIG. 1 depicts the relationship between the ratio of iso $C_6$s/lights in the procedure as a function of the n-hexane conversion and shows the improvement in isomerization for UHP-Y catalysts.
Figure 2:
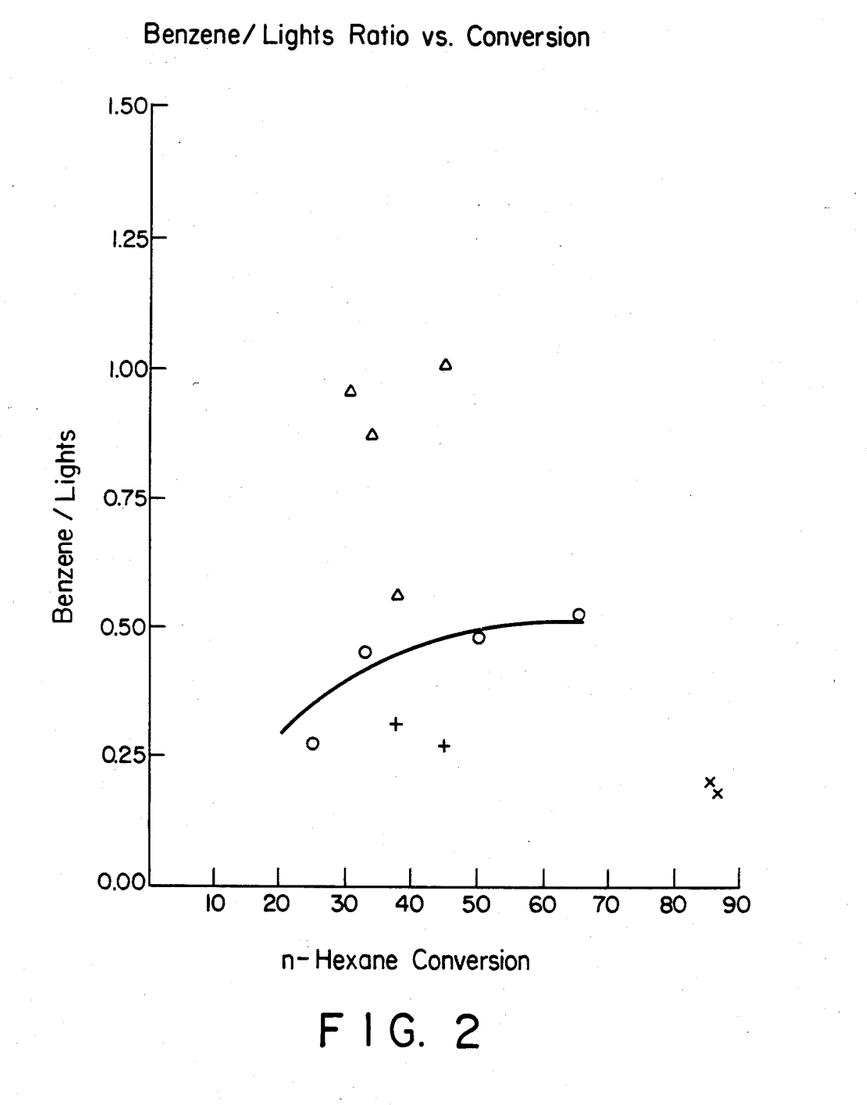
FIG. 2 depicts the relationship between the ratio of benzene/lights in the products as a function of the n-hexane conversion and shows the improvement in dehydrocyclization for UHP-Y catalysts.
Figure 3:
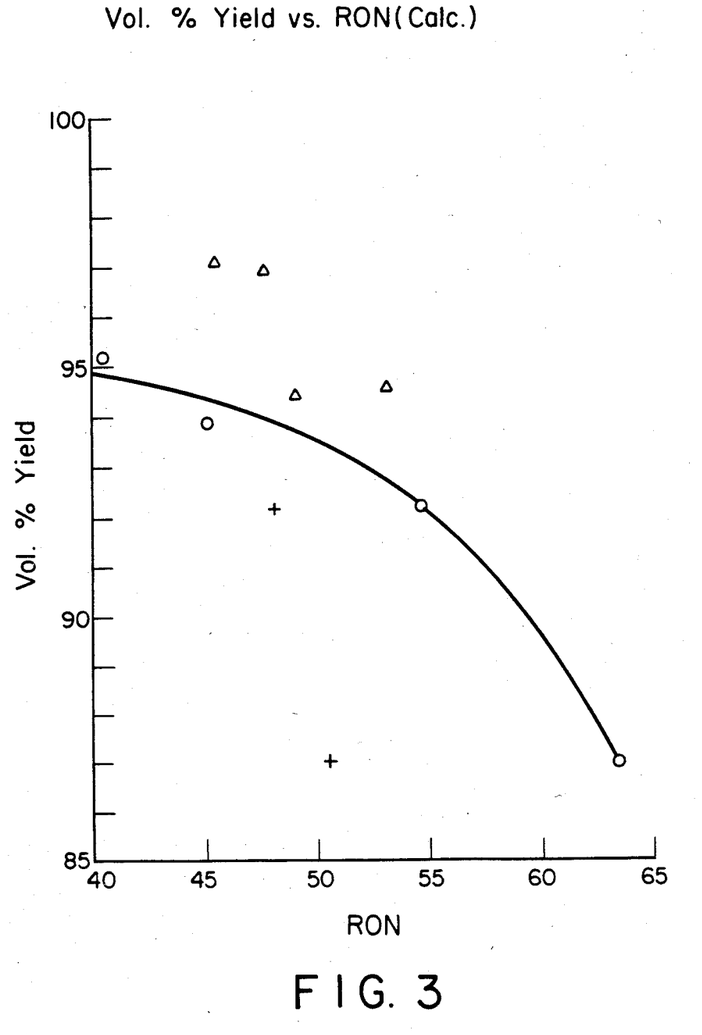
FIGS. 3 and 4 depict the relationship between the Volume % Yield and the Research Octane Number (RON) for the products of processes employing UHP-Y catalysts and depict comparative catalysts not containing UHP-Y.
Figure 4:
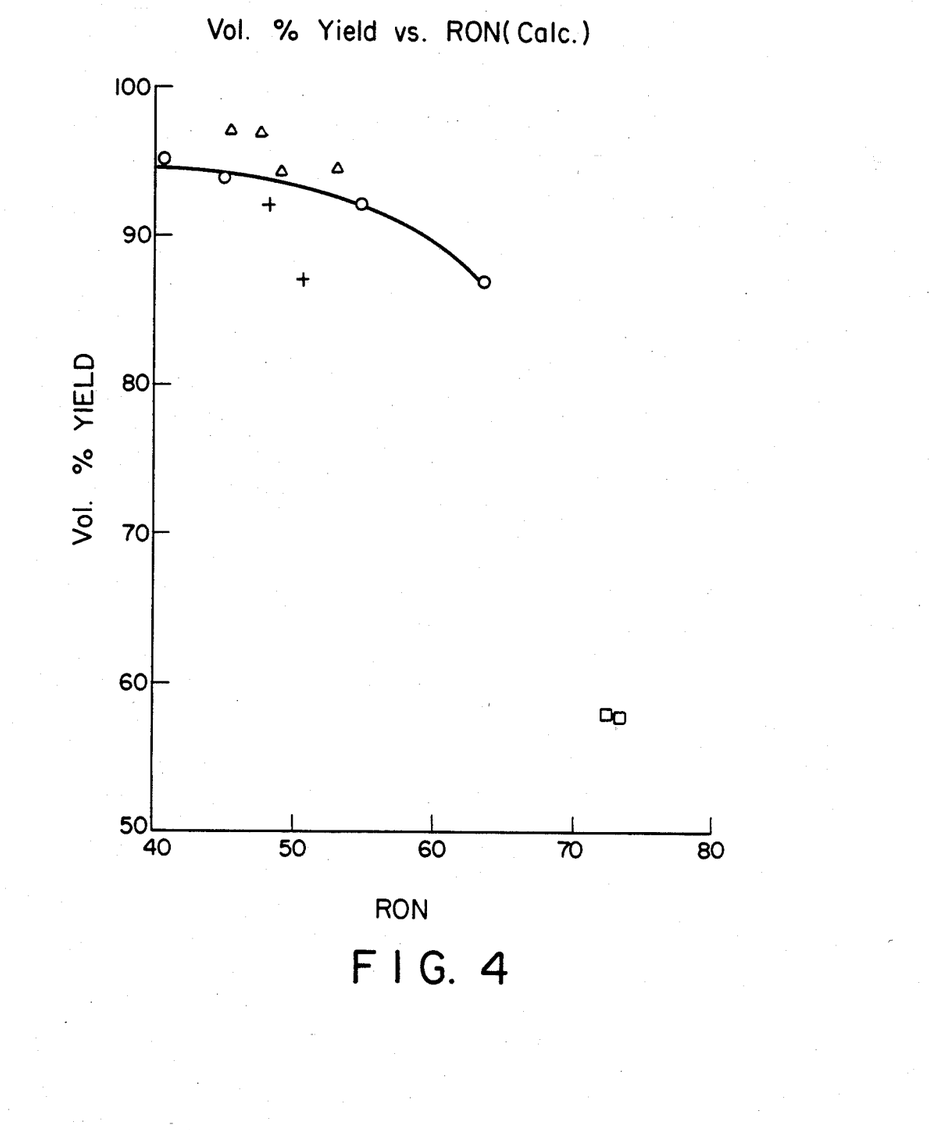

The results set forth in the following Tables demonstrate the dramatic improvement that UHP-Y has in a reforming dehydrocyclization process when employed with a Pt/Cl-alumina catalyst is demonstrated in the ratio of benzene to lights ($C_1$ to $C_5$) and iso-$C_6$s to lights as a function of the conversion. FIGS. 1 and 2 graphically depict the benzene/lights and iso-$C_6$s/lights as a function of n-hexane conversion for the several catalysts. FIGS. 3 and 4 graphically depict the improvement in calculated research octane provided by catalysts containing UHP-Y as compared with catalysts containing LZ-210 or mordenite. The figures plot the average of the two values set forth in each table.

The UHP-Y-containing catalyst shows several improvements when employed in reforming/dehydrocyclization processes when compared a catalyst that does not contain UHP-Y. Processes employing the UHP-Y-containing catalyst are observed to have improved selectivity to the preferred reforming/dehydrocyclization products. Further, such processes have reduced lights as products showing a reduction in the hydrocracking activity of such catalysts. The dramatic improvement in the product distribution of processes employing UHP-Y-containing catalysts is depicted in the figures wherein the benzene/lights and iso-$C_2$s/lights ratios are ploted as a function of feedstock conversion. The significantly higher benzene/lights and iso-$C_6$s/lights ratios demonstrate the dramatic improvement in selectivity to desired products in processes employing UHP-Y-containing catalysts.

TABLE I-A

| (Reference Catalyst A) | | | | |
|---|---|---|---|---|
| GC PRODUCT ANALYSIS (WEIGHT PERCENT): | | | | |
| METHANE | 0.83 | 0.75 | 0.74 | 0.92 |
| ETHANE | 0.90 | 0.79 | 0.83 | 1.07 |
| PROPANE | 2.26 | 2.02 | 1.98 | 2.48 |
| ISOBUTANE | 0.00 | 0.05 | 0.07 | 0.12 |
| N—BUTANE | 1.23 | 1.07 | 0.96 | 1.27 |
| ISO-PENTANE | 0.21 | 0.19 | 0.24 | 0.24 |
| N—PENTANE | 1.89 | 1.84 | 1.39 | 1.58 |
| TOTAL LIGHTS (C5—) | 7.31 | 6.72 | 6.23 | 7.68 |
| 2,2 DIMETHYL BUTANE | 0.14 | 0.15 | 0.36 | 0.35 |
| 2 METHYL PENTANE | 11.23 | 11.66 | 12.90 | 12.35 |
| 3 METHYL PENTANE | 9.32 | 9.83 | 10.73 | 10.24 |
| N—HEXANE | 65.45 | 63.78 | 60.00 | 59.43 |
| METHYL CYCLOPENTANE (MCP) | 4.88 | 5.59 | 6.71 | 6.61 |
| CYCLOHEXANE | 0.00 | 0.06 | 0.00 | 0.00 |
| TOTAL C6 SATURATES | 91.01 | 91.07 | 90.70 | 88.97 |
| BENZENE | 1.67 | 2.21 | 3.07 | 3.35 |
| CALCULATIONS: | | | | |
| METHANE/PROPANE | 0.37 | 0.37 | 0.36 | 0.37 |
| ISO-BUTANE/N—BUTANE | 0.00 | 0.05 | 0.08 | 0.10 |
| ISO-PENTANE/N—PENTANE | 0.11 | 0.10 | 0.17 | 0.15 |
| CONVERSION (Vol. %) | 24.21 | 26.14 | | |
| CONVERSION % | | | 30.52 | 31.19 |
| BENZENE SEL. % | 6.91 | 8.46 | 10.05 | 10.74 |
| LIGHTS SEL. % | 30.20 | 25.70 | 20.43 | 24.62 |
| MCP SEL. % | −19.90 | −15.70 | −9.76 | −9.90 |
| ISO-C6 SEL. % | 69.15 | 67.91 | 65.65 | 60.90 |
| RON (CALCULATED) | 39.64 | 41.17 | 44.14 | 43.94 |
| VOLUME % YIELD (CALCULATED) | 95.08 | 95.38 | 95.13 | 93.80 |
| HOURS ON STREAM | 20.0 | 21.0 | 25.00 | 26.25 |
| TEMPERATURE (°F.) | 860 | 860 | 902 | 901 |

TABLE II-A (Reference Catalyst B)

| GC PRODUCT ANALYSIS (WEIGHT PERCENT): | | | | |
|---|---|---|---|---|
| METHANE | 1.30 | 1.03 | 1.87 | 1.67 |
| ETHANE | 1.63 | 1.30 | 2.56 | 2.31 |
| PROPANE | 2.83 | 2.31 | 4.00 | 3.56 |
| ISOBUTANE | 0.60 | 0.52 | 1.50 | 1.38 |
| N—BUTANE | 1.99 | 1.70 | 2.83 | 2.49 |
| ISO-PENTANE | 0.86 | 0.74 | 1.96 | 1.80 |
| N—PENTANE | 2.17 | 1.94 | 2.72 | 2.58 |
| TOTAL LIGHTS (C5—) | 11.38 | 9.53 | 17.44 | 15.79 |
| 2,2 DIMETHYL BUTANE | 3.10 | 2.99 | 4.83 | 4.88 |
| 2 METHYL PENTANE | 20.94 | 20.97 | 22.19 | 22.72 |
| 3 METHYL PENTANE | 14.44 | 14.90 | 14.92 | 15.57 |
| N—HEXANE | 42.16 | 43.49 | 28.84 | 30.18 |
| METHYL CYCLOPENTANE (MCP) | 3.10 | 3.04 | 2.73 | 2.72 |
| CYCLOHEXANE | 0.00 | 0.00 | 0.00 | 0.00 |
| TOTAL C6 SATURATES | 83.74 | 85.38 | 73.52 | 76.07 |
| BENZENE | 4.89 | 5.08 | 9.04 | 8.14 |
| CALCULATIONS: | | | | |
| METHANE/PROPANE | 0.46 | 0.44 | 0.47 | 0.47 |
| ISO-BUTANE/N—BUTANE | 0.30 | 0.31 | 0.53 | 0.55 |
| ISO-PENTANE/N—PENTANE | 0.40 | 0.38 | 0.72 | 0.70 |
| CONVERSION (Vol. %) | 51.18 | 49.64 | 66.60 | 65.05 |
| BENZENE SEL. % | 9.55 | 10.24 | 13.57 | 12.52 |
| LIGHTS SEL. % | 22.23 | 19.21 | 26.19 | 24.27 |
| MCP SEL. % | −12.88 | −13.41 | −10.45 | −10.72 |
| ISO-C6 SEL. % | 67.47 | 70.33 | 57.05 | 60.29 |
| RON (CALCULATED) | 54.86 | 54.42 | 63.84 | 63.09 |
| VOLUME % YIELD (CALCULATED) | 91.50 | 92.94 | 86.18 | 87.76 |
| HOURS ON STREAM | 20.75 | 21.50 | 24.00 | 25.00 |
| TEMPERATURE (°F.) | 861 | 860 | 901 | 900 |

TABLE III-A (Catalyst C)

| GC PRODUCT ANALYSIS (WEIGHT PERCENT): | | | | |
|---|---|---|---|---|
| METHANE | 0.06 | 0.08 | 0.15 | 0.16 |
| ETHANE | 0.17 | 0.23 | 0.43 | 0.49 |
| PROPANE | 1.47 | 1.84 | 2.82 | 3.36 |
| ISOBUTANE | 0.29 | 0.30 | 0.49 | 0.67 |
| N—BUTANE | 0.37 | 0.37 | 0.66 | 0.83 |
| ISO-PENTANE | 0.36 | 0.30 | 0.47 | 0.46 |
| N—PENTANE | 0.32 | 0.26 | 0.47 | 0.42 |
| TOTAL LIGHTS (C5—) | 3.04 | 3.40 | 5.47 | 6.40 |
| 2,2 DIMETHYL BUTANE | 0.67 | 0.74 | 0.78 | 0.79 |
| 2 METHYL PENTANE | 15.24 | 15.98 | 15.94 | 15.79 |
| 3 METHYL PENTANE | 12.44 | 12.61 | 13.04 | 12.85 |
| N—HEXANE | 57.52 | 56.30 | 53.58 | 53.27 |
| METHYL CYCLOPENTANE | 8.02 | 7.75 | 7.42 | 7.29 |
| CYCLOHEXANE | 0.35 | 0.36 | 0.31 | 0.37 |
| TOTAL C6 SATURATES | 94.24 | 93.74 | 91.07 | 90.37 |
| BENZENE | 2.72 | 2.86 | 3.46 | 3.24 |
| CALCULATIONS: | | | | |
| METHANE/PROPANE | 0.04 | 0.04 | 0.05 | 0.05 |
| ISO-BUT/N—BUT | 0.79 | 0.82 | 0.74 | 0.81 |
| ISO-PENT/N—PENT | 1.14 | 1.16 | 1.00 | 1.08 |
| CONVERSION % | 33.40 | 34.80 | 37.96 | 38.31 |
| BENZENE SEL. % | 8.16 | 8.23 | 9.12 | 8.45 |
| LIGHTS SEL. % | 9.10 | 9.76 | 14.41 | 16.69 |
| MCP SEL. % | −5.02 | −5.58 | −5.99 | −6.27 |
| ISO-C6 SEL. % | 74.12 | 73.95 | 68.81 | 67.49 |
| RON (CALCULATED) | 47.31 | 47.92 | 49.09 | 48.93 |
| VOLUME % YIELD (CALCULATED) | 97.24 | 96.76 | 94.95 | 94.02 |
| HOURS ON STREAM | 20.75 | 21.50 | 26.00 | 27.00 |
| TEMPERATURE (°F.) | 860 | 862 | 900 | 898 |

TABLE IV-A (Catalyst D)

| GC PRODUCT ANALYSIS (WEIGHT PERCENT): | | | | |
|---|---|---|---|---|
| METHANE | 0.18 | 0.18 | 0.32 | 0.35 |
| ETHANE | 0.30 | 0.29 | 0.56 | 0.62 |
| PROPANE | 1.38 | 1.30 | 2.42 | 2.76 |
| ISOBUTANE | 0.15 | 0.10 | 0.25 | 0.28 |
| N—BUTANE | 0.50 | 0.46 | 0.78 | 0.88 |
| ISO-PENTANE | 0.14 | 0.16 | 0.28 | 0.26 |
| N—PENTANE | 0.39 | 0.40 | 0.66 | 0.61 |
| TOTAL LIGHTS (C5—) | 3.04 | 2.91 | 5.28 | 5.76 |

TABLE IV-A-continued
(Catalyst D)

| | | | | |
|---|---|---|---|---|
| 2,2 DIMETHYL BUTANE | 0.48 | 0.54 | 1.21 | 1.07 |
| 2 METHYL PENTANE | 14.13 | 14.57 | 20.46 | 19.23 |
| 3 METHYL PENTANE | 11.29 | 11.70 | 15.16 | 14.49 |
| N—HEXANE | 60.62 | 59.26 | 46.43 | 48.14 |
| METHYL CYCLOPENTANE | 7.79 | 7.82 | 5.61 | 5.80 |
| CYCLOHEXANE | 0.03 | 0.09 | 0.04 | 0.11 |
| TOTAL C6 SATURATES | 94.35 | 93.99 | 88.91 | 88.84 |
| BENZENE | 2.60 | 3.10 | 5.81 | 5.39 |
| CALCULATIONS: | | | | |
| METHANE/PROPANE | 0.13 | 0.14 | 0.13 | 0.13 |
| ISO-BUT/N—BUT | 0.30 | 0.22 | 0.32 | 0.32 |
| ISO-PENT/N—PENT | 0.37 | 0.40 | 0.43 | 0.42 |
| CONVERSION % | 29.80 | 31.38 | 46.24 | 44.26 |
| BENZENE SEL. % | 8.73 | 9.88 | 12.57 | 12.19 |
| LIGHTS SEL. % | 10.22 | 9.27 | 11.42 | 13.02 |
| MCP SEL. % | −6.38 | −5.96 | −8.83 | −8.80 |
| ISO-C6 SEL. % | 73.80 | 73.17 | 71.20 | 69.95 |
| RON (CALCULATED) | 44.97 | 45.99 | 53.79 | 52.44 |
| VOLUME % YIELD (CALCULATED) | 97.18 | 97.20 | 94.86 | 94.35 |
| HOURS ON STREAM | 19.50 | 20.00 | 23.00 | 24.00 |
| TEMPERATURE (°F.) | 862 | 865 | 896 | 899 |

TABLE V-A
(Catalyst E)
GC PRODUCT ANALYSIS (WEIGHT PERCENT):

| | | | | |
|---|---|---|---|---|
| METHANE | 0.11 | 0.10 | 0.23 | 0.21 |
| ETHANE | 0.64 | 0.64 | 1.25 | 1.16 |
| PROPANE | 5.31 | 5.53 | 8.97 | 8.45 |
| ISOBUTANE | 0.30 | 0.32 | 0.66 | 0.65 |
| N—BUTANE | 0.86 | 0.91 | 1.61 | 1.66 |
| ISO-PENTANE | 0.21 | 0.17 | 0.28 | 0.34 |
| N—PENTANE | 0.30 | 0.26 | 0.35 | 0.47 |
| TOTAL LIGHTS (C5−) | 7.74 | 7.95 | 13.36 | 12.94 |
| 2,2 DIMETHYL BUTANE | 0.61 | 0.71 | 0.90 | 0.79 |
| 2 METHYL PENTANE | 14.63 | 14.35 | 16.74 | 14.76 |
| 3 METHYL PENTANE | 12.15 | 11.97 | 13.03 | 12.31 |
| N—HEXANE | 53.58 | 53.67 | 45.78 | 48.44 |
| METHYL CYCLOPENTANE | 8.56 | 8.72 | 6.54 | 7.14 |
| CYCLOHEXANE | 0.27 | 0.28 | 0.13 | 0.13 |
| TOTAL C6 SATURATES | 89.81 | 89.70 | 83.13 | 83.58 |
| BENZENE | 2.45 | 2.35 | 3.51 | 3.48 |
| CALCULATIONS: | | | | |
| METHANE/PROPANE | 0.02 | 0.02 | 0.03 | 0.02 |
| ISO-BUT/N—BUT | 0.35 | 0.36 | 0.41 | 0.39 |
| ISO-PENT/N—PENT | 0.68 | 0.65 | 0.80 | 0.74 |
| CONVERSION % | 37.95 | 37.86 | 46.98 | 43.91 |
| BENZENE SEL. % | 6.45 | 6.21 | 7.46 | 7.93 |
| LIGHTS SEL. % | 20.40 | 21.00 | 28.44 | 29.47 |
| MCP SEL. % | −3.00 | −2.56 | −6.70 | −5.82 |
| ISO-C6 SEL. % | 62.51 | 61.72 | 57.17 | 54.78 |
| RON (CALCULATED) | 48.19 | 48.06 | 51.46 | 49.77 |
| VOLUME % YIELD (CALCULATED) | 92.31 | 92.02 | 86.78 | 87.30 |
| HOURS ON STREAM | 19.75 | 20.25 | 22.75 | 23.25 |
| TEMPERATURE (°F.) | 862 | 860 | 900 | 901 |

TABLE VI-A
(Comparative Catalyst F)
GC PRODUCT ANALYSIS (WEIGHT PERCENT):

| | | | | |
|---|---|---|---|---|
| METHANE | 1.02 | 1.16 | 1.58 | 1.62 |
| ETHANE | 3.65 | 3.88 | 4.65 | 4.65 |
| PROPANE | 28.82 | 30.75 | 28.53 | 29.15 |
| ISOBUTANE | 2.78 | 2.79 | 2.40 | 2.43 |
| N—BUTANE | 3.80 | 3.76 | 3.13 | 3.31 |
| ISO-PENTANE | 2.78 | 2.46 | 1.85 | 2.08 |
| N—PENTANE | 1.64 | 1.45 | 1.23 | 1.40 |
| TOTAL LIGHTS (C5−) | 44.45 | 46.26 | 43.36 | 44.64 |
| 2,2 DIMETHYL BUTANE | 3.59 | 3.68 | 3.44 | 3.44 |
| 2 METHYL PENTANE | 19.00 | 18.45 | 18.81 | 18.57 |
| 3 METHYL PENTANE | 12.06 | 11.71 | 12.03 | 11.74 |
| N—HEXANE | 11.92 | 11.22 | 12.86 | 12.03 |
| METHYL CYCLOPENTANE | 0.61 | 0.55 | 0.59 | 0.59 |
| CYCLOHEXANE | 0.06 | 0.06 | 0.04 | 0.05 |
| TOTAL C6 SATURATES | 47.24 | 45.66 | 47.78 | 46.43 |
| BENZENE | 8.31 | 8.08 | 8.86 | 8.94 |
| CALCULATIONS: | | | | |

TABLE VI-A-continued
(Comparative Catalyst F)

| | | | | |
|---|---|---|---|---|
| METHANE/PROPANE | 0.04 | 0.04 | 0.06 | 0.06 |
| ISO-BUT/N—BUT | 0.73 | 0.74 | 0.76 | 0.74 |
| ISO-PENT/N—PENT | 1.67 | 1.69 | 1.51 | 1.48 |
| CONVERSION % | 86.20 | 87.01 | 85.10 | 86.07 |
| BENZENE SEL. % | 9.64 | 9.28 | 10.41 | 10.38 |
| LIGHTS SEL. % | 51.57 | 53.16 | 50.95 | 51.86 |
| MCP SEL. % | −10.53 | −10.51 | −10.69 | −10.58 |
| ISO-C6 SEL. % | 35.69 | 34.42 | 35.69 | 34.69 |
| RON (CALCULATED) | 73.04 | 73.35 | 71.89 | 72.67 |
| VOLUME % YIELD (CALCULATED) | 58.93 | 56.66 | 58.50 | 57.62 |
| HOURS ON STREAM | 19.00 | 20.25 | 24.00 | 25.50 |
| TEMPERATURE (°F.) | 859 | 862 | 904 | 902 |

What is claimed is:

1. The process for reforming or dehydrocyclization of a hydrocarbon reforming feedstock comprising contacting said hydrocarbon feedstock under effective reforming or dehydrocyclization conditions with a catalyst comprising:
   (a) the zeolite UHP-Y; and
   (b) at least one Group VIII metal.

2. The process of claim 1 wherein said Group VIII metal is supported on a carrier.

3. The process of claim 2 wherein said Group VIII metal is supported on the UHP-Y.

4. The process according to claim 2 wherein said carrier is an inorganic oxide carrier.

5. The process according to claim 4 wherein said inorganic oxide carrier is at least one selected from the group consisting of aluminas, silicas, silica-aluminas, titanias, magnesias, alumina-borias, alumina-titanias and clays.

6. The process according to claim 5 wherein said inorganic oxide carrier is selected from the group consisting of aluminas, silicas, silica-aluminas and mixtures thereof.

7. The process according to claim 6 wherein said inorganic oxide carrier is a transition-alumina.

8. The process according to claim 7 wherein said transition-alumina is a gamma-alumina.

9. The process according to claim 1 or claim 8 wherein said Group VIII metal is present in an amount between about 0.1 wt.% and 2 wt.%, based on the total weight of the catalyst.

10. The process according to claim 9 wherein said amount is between about 0.2 wt.% and about 1.2 wt.%, based on the total weight of the catalyst.

11. The process according to claim 10 wherein said amount is between 0.2 wt.% and about 0.8 wt. %.

12. The process according to claim 9 wherein said Group VIII metal is at least one metal selected from the group consisting of Pt, Ir, Pd, Rh, Ru and mixtures thereof.

13. The process according to claim 12 wherein said Group VIII metal is selected from the group consisting of platinum and iridium and mixtures thereof.

14. The process according to claim 1 wherein at least two metal components are present wherein said weight ratio of said first metal to said second metal is between about 1:5 and about 5:1, said first metal is at least one Group VIII metal selected from the group consisting of Pt, Ir, Pd, Rh and Ru and said second metal component is at least one selected from the group consisting of rhenium, tungsten and tin.

15. The reforming process comprising contacting a feedstock suitable for reforming under effective reforming conditions with a catalyst wherein said catalyst comprises:
   (a) the zeolite UHP-Y; and
   (b) a reforming catalyst component comprising at least one Group VIII metal and a halogenated-carrier containing an effective amount of at least one halogen.

16. A process according to claim 15 wherein said reforming catalyst component in part (b) comprises: between about 0.1 and about 2 percent by weight of at least one Group VIII metal selected from the group consisting of Pt, Ir, Pd, Rh and Ru; between about 0.2 and about 2 wt.% halogen; and between about 96 wt.% and about 99.7 wt.% of an alumina as said carrier.

17. The process according to claim 16 wherein said Group VIII metal is at least one of platinum and iridium and is present in an amount between about 0.2 wt.% and 1.2 wt.%.

18. The process according to claim 17 wherein said amount is between 0.2 wt.% and about 0.8 wt.%.

19. The process according to claim 15 or claim 16 wherein said catalyst comprises between about 1 and about 99 percent by weight UHP-Y.

20. The process according to claim 19 wherein said catalyst comprises between about 5 and about 40 weight percent of the zeolite UHP-Y.

21. The process according to claim 15 wherein said carrier is at least one inorganic oxide carrier selected from the group consisting of aluminas, silicas, silica-aluminas, titanias, magnesias, alumina-borias, alumina-titanias and clays.

22. The process according to claim 21 wherein said inorganic oxide carrier is selected from the group consisting of aluminas, silicas, silica-aluminas and mixtures thereof.

23. The process according to claim 22 wherein said alumina is a transition-alumina.

24. The process according to claim 16 or claim 22 wherein said alumina is a gamma-alumina.

25. The process of claim 16 wherein said Group VIII metal is at least one of platinum and iridium, said halogen is chlorine and said alumina is a gamma-alumina.

26. The process of claim 25 wherein said Group VIII metal is platinum and is present in an amount between about 0.2 wt.% and about 1.2 wt.%, chlorine is present in an amount between about 0.2 and about 1.0 wt.%, wherein said amounts are based on the total weight of said reforming catalyst component.

27. The process of claim 1 or claim 15 wherein said hydrocarbon feedstock is selected from the group consisting of: (1) paraffinic hydrocarbons containing from 6 to 12 carbon atoms; (2) naphtha fractions boiling between about 80° F. and about 450° F.; (3) upstream reformates; (4) heavy hydrocracked gasoline fractions; and (5) and mixtures of (1), (2), (3) and (4).

28. The process of claim 27 wherein said naphtha fraction is selected from the group consisting of virgin naphthas, hydrogenated cracked naphthas, Fischer-Tropsch naphthas and mixtures thereof.

29. The process of claim 27 wherein said paraffinic hydrocarbon is selected from the group consisting of n-hexane, 2-methylpentane, 3-methylpentane, n-heptane, 2-methylhexane, 3-methylhexane, 3-ethyl-pentane, 2,5-dimethylhexane, n-octane, 2-methylheptane, 3-methylheptane, 4-methylheptane, 3-ethylhexane, n-nonane, 2-methyloctane, 3-methyloctane, n-decane and mixtures thereof.

* * * * *